United States Patent [19]
Wyatt et al.

[11] Patent Number: 5,360,586
[45] Date of Patent: Nov. 1, 1994

[54] BIODEGRADABLE CELLULOSIC MATERIAL AND PROCESS FOR MAKING SUCH MATERIAL

[75] Inventors: Danny R. Wyatt, 925 Ridgecrest, Carthage, Mo. 64836; Everette L. Wyatt, Carthage, Mo.

[73] Assignee: Danny R. Wyatt, Carthage, Mo.

[21] Appl. No.: 972,937

[22] Filed: Nov. 6, 1992

[51] Int. Cl.$^5$ .................. B29D 31/00; C08H 1/00; C09D 101/02; C08J 9/14
[52] U.S. Cl. ......................... 264/54; 264/53; 264/211.23; 106/122; 106/127; 521/84.1; 521/129.1
[58] Field of Search ............. 521/84.1, 109.1; 106/122, 127; 264/53, 54, 211.23

[56] References Cited

U.S. PATENT DOCUMENTS

| | | | |
|---|---|---|---|
| 92,303 | 7/1869 | Goetze | 106/127 |
| 246,391 | 8/1881 | Howell | 106/127 |
| 750,548 | 1/1904 | Lenhart | 106/127 |
| 1,796,794 | 3/1931 | Koppelman . | |
| 1,945,024 | 1/1934 | Coil et al. | 154/54 |
| 3,003,911 | 10/1961 | Lindstrom et al. | 162/100 |
| 3,546,143 | 12/1970 | Corbett | 521/84.1 |
| 3,736,221 | 5/1973 | Evers et al. | 161/170 |
| 3,741,863 | 6/1973 | Brooks | 162/4 |
| 3,891,497 | 6/1975 | Daane et al. | 162/6 |
| 3,895,997 | 7/1975 | Haywood | 162/100 |
| 3,940,466 | 2/1976 | Evers et al. | 264/45.3 |
| 4,098,649 | 7/1978 | Redker | 201/2.5 |
| 4,111,744 | 9/1978 | Reiniger | 162/100 |
| 4,123,489 | 10/1978 | Kelley | 264/141 |
| 4,148,952 | 4/1979 | Nelson et al. | 428/2 |
| 4,377,440 | 3/1983 | Gaaland | 162/101 |
| 4,500,586 | 2/1985 | Bussey, Jr. | 428/174 |
| 4,508,595 | 4/1985 | Gaaland | 162/158 |
| 4,808,263 | 2/1989 | Honer | 162/4 |
| 4,867,383 | 9/1989 | Terry et al. | 241/24 |
| 4,894,192 | 1/1990 | Warych | 264/68 |
| 4,997,091 | 3/1991 | McCrea | 206/584 |
| 5,011,741 | 4/1991 | Hoffman | 428/503.1 |
| 5,106,880 | 4/1992 | Miller et al. | 106/122 |

FOREIGN PATENT DOCUMENTS

| | | | |
|---|---|---|---|
| 0201807 | 11/1984 | Japan | 521/84.1 |
| 0655682 | 4/1979 | U.S.S.R. | 106/122 |

*Primary Examiner*—Peter Szekely
*Attorney, Agent, or Firm*—Senniger, Powers, Leavitt & Roedel

[57] ABSTRACT

A process for making a shaped biodegradable cellulosic article from cellulose-containing material having a water content of less than about 50 percent by weight. The process includes forming a dry mix of the material, a bonding agent and an expander. The dry mix is fed to a screw extruder and pressurized to a nominal pressure in the extruder. Water is injected into the pressurized dry mix. The wetted mixture is then extruded into a shaped article. A biodegradable product is also disclosed herein.

13 Claims, No Drawings

BIODEGRADABLE CELLULOSIC MATERIAL AND PROCESS FOR MAKING SUCH MATERIAL

SUMMARY OF THE INVENTION

This invention relates generally to a biodegradable article and more particularly to a biodegradable packing material and a process for making the same.

Fragile articles, such as glassware, are commonly packed in containers for shipping along with peanut-shaped, shock absorbing packing material made from a lightweight plastic such as polystyrene foam. These foam "peanuts" surround the article within the container and fill in the space between the container walls and the article so that the article is protected during transport. However, although polystyrene foam peanuts satisfactorily protect articles from damage during shipping, they present a disposal problem after use because they are not biodegradable.

Biodegradable packing material, such as the dunnage disclosed in U.S. Pat. No. 4,997,091, has been developed to solve the environmental concerns associated with polystyrene foam peanuts. However, the biodegradable dunnage disclosed in U.S. Pat. No. 4,977,091 is deficient in that it is too dense and too hard. Dunnage which is too dense unnecessarily increases the weight of the container. If the dunnage material is too hard, the more likely that the article may be scratched by the material or broken because of the reduced shock absorbing capability of the material. Biodegradable dunnage disclosed in U.S. Pat. No. 4,977,091 is produced by a heavy slurry mix which is directly introduced into a forming machine. A large and costly pumping system must be provided to pump the heavy slurry mix from a mixing tank to the forming machine.

Moreover, there is presently a need for a process which is readily controlled to produce biodegradable material of different density and hardness so that the material could be used to make other biodegradable products such as: disposable diapers, liquid containers (e.g., cups and plates), appliance housings (e.g., for telephones and televisions), heat sources such as cooking briquettes and fire logs, constructions panels, and food packaging materials.

Among the several objects and features of this invention may be noted the provision of process for making a shaped biodegradable cellulosic article having a density and hardness suitable for shipping fragile articles, such as glassware; the provision of such a process in which the density and hardness are readily controlled to produce biodegradable material suitable for different applications; and the provision of a biodegradable cellulosic article which may be formed in the shape of a shipping peanut which is easy and cost-efficient to manufacture.

Generally, a process for making a shaped biodegradable cellulosic article from cellulose-containing material having a water content less than about 50 percent by weight comprises mixing the cellulose-containing material, a bonding agent and an expander in a dry mix. The dry mix is pressurized by the extruder. Water is injected into the pressurized dry mix and the wetted mixture is extruded into a shaped article.

A shaped biodegradable product made according to the previously described process comprises cellulose in an amount ranging from about 5 percent to about 90 percent by weight, bonding agents in an amount ranging from about 3 percent to about 90 percent by weight, and expanders in an amount ranging from about 3 percent to about 80 percent by weight. The product has a water content of less than 40 percent by weight. The product has a density of less than 1.0 pound per cubic foot.

Other objects and features will be in part apparent and in part pointed out hereinafter.

DETAILED DESCRIPTION OF THE PREFERRED EMBODIMENT

This invention particularly relates to an improved biodegradable material and a process of making the same in the form of a peanut for use as packing material. It is believed, however, that by changing the relative concentration of certain components of the material to select a different density and hardness, the process of the present invention can produce material suitable for other applications, such as in disposable diapers, containers (e.g., cups, plates and bowls), appliance housings (e.g., for telephones and televisions), heat sources such as cooking briquettes and fire logs, constructions panels, and food packaging.

The process, which is described in more detail hereinafter, includes the step of mixing a cellulose containing material (e.g., newspaper) with a bonding agent, an expander and, preferably, one or more performance enhancing additives in a dry mix. The dry mix is fed to an extruder and pressurized to a nominal pressure by the extruder. Water is injected into the mix, which is then extruded into a shaped article, such as a packing peanut.

The particles of cellulose in the mix are held together in the shaped article by the bonding agent. The expanding or foaming agent expands the volume of the article (which consequently decreases its density), and the enhancers improve the performance of the article such as by preventing rot or retarding fire.

Cellulose-containing source material may be obtained from used paper products such as newsprint or computer paper. Newsprint and computer paper are sanitary, therefore, no decontamination is required. Contaminated cellulose-containing material, such as corrugated waste paper which has toxic adhesives, may be used, but the contaminants must be removed. As one alternative, cellulose may also be provided in a virgin state, e.g., tree pulp, soybean stalks, corn stalks, peanut vines and hulls. However, to conserve resources, recycling of used cellulose containing materials to make the biodegradable article is more desirable.

Preferably, the cellulose-containing source material is pulverized to particulate size for better blending with the additives. However, larger pieces of cellulose such as newspaper torn into squares as large as about 2"×2" may be used in the mix. Thus, while it is preferable that the cellulose material be particulate, larger pieces may be used and fall within the scope of the present invention.

Cellulose may be present in the composition of the article in amounts ranging between 5 and 90 percent by weight, preferably in amounts ranging between 5 and 80 percent by weight, and most preferably in amounts ranging between 20 and 60 percent by weight. Before the cellulose is mixed with the additives, its water content is reduced to less than 50 percent by weight. More preferably, the water content of the cellulose prior to mixing is less than 30 percent by weight, and most preferably the water content of the cellulose is in a range of between 3 and 25 percent by weight. The cellulose may be dried in unagitated equipment by indirect heating or by contact with warm air. Tray dryers or screen-conveyor dryers, as are known in the art, are suitable for accomplishing this step.

As previously stated, the components added to the cellulose-containing source material fall into three categories, namely, bonding agents for bonding the cellulose particles, expanders for expanding the volume of the article and performance enhancing additives for enhancing the overall quality of the article. Bonding agents may be selected from a group including: casein, protein, gluten, starch, gelatin or flour. Casein, which is the phosphoprotein of fresh milk, has been found to be particularly well suited as a binder in the composition. Bonding agents may be present in amounts ranging between 3 and 90 percent by weight, preferably in amounts ranging between 15 and 80 percent by weight, and most preferably between 15 and 45 percent by weight.

Expanders which may be used in the composition of the article consist of: casein; starch; tataric acid; calcium carbonate; baking powder; and flour. Starch and casein have been found to be an excellent expander of cellulose. Expanders may be present in the composition of the article in amounts ranging between 3 and 80 percent by weight, preferably in amounts ranging between 3 and 50 percent by weight, and most preferably between 3 and 30 percent by weight.

It is believed that there is substantial flexibility in the choice of the specific bonding agent(s) and expander(s) which are used in the composition. Thus, the manufacturer may choose the bonding agent and expander based on availability and cost at the time of manufacture. Most of the additives are agricultural by-products from grains, cereals, vegetables and dairy products. These products are priced daily, so that the manufacturer may take advantage of the market to obtain the lowest cost bonding agent and expander.

Performance enhancing additives in the composition may include: boron (for fire retardancy), amino acids (for controlling bacteria and mold), nitrate (for controlling bacteria and mold), lactic acid (for controlling bacteria and mold), and carigenin (for added elasticity). Enhancers may be present in the composition of the article in amounts of less than 50 percent by weight, preferably in amounts of less than 40 percent by weight, and most preferably in amounts less than 30 percent by weight. Amino acids, nitrate or lactic acid are preferably added to the composition of packing peanuts to prevent them from molding, especially if there is any likelihood that the peanuts may be exposed to moisture. Boron or another fire retardant is also desirably added to the composition when packing peanuts are produced.

In the process of the present invention, cellulose-containing source material, such as newsprint, is first pulverized. The comminution of the cellulose prior to its introduction into the mix may be performed, for example, by a shredder or a hammer mill (e.g., Model 4W, manufactured by J. B. Sedberry of Tyler, Tex.). The pulverized cellulose is then dry mixed with one or more bonding agents, one or more expanders and one or more performance enhancing additives. However, all of the additives (i.e., bonding agents, expanders and enhancers) can be introduced into the cellulose at the shredder or hammer mill as the cellulose is being pulverized. Introduction of the additives at this point might be done to reduce the size of one or more of the additives, or to prepare the mix for storage and later use.

Dry mixing of the ingredients is preferred over mixing in a water slurry. A slurry mixture is too wet to be formed so that water must be removed prior to its introduction into the extruder. Moreover, the water content of the extruded article produced when the ingredients are mixed in a slurry is higher than when they are dry mixed so that more time and energy is required to dry the extruded product when a slurry mix is used. A dry mix can be stored prior to usage for long periods of time, whereas a slurry must be used in a relatively short time before the organic ingredients in the mixture begin to mold. The dry mix can be fluidized and conveyed in ducts to the extruder by a relatively inexpensive blower system, while a slurry must be pumped into the extruder using a costly pumping system.

To mix the ingredients in a generally dry state, an air chamber may be used in which circulating air within the chamber mixes the ingredients. The mixed ingredients may then be stored in a separate container or hopper or be transported directly (e.g., by an air duct) to an extruder forming machine. It is also possible to add the ingredients directly into the extruder wherein they are mixed by the action of the extruder.

In the extruder, the dry mix is pressurized to a nominal pressure in a preferred range of between about 18 to 30 psi absolute for ensuring that the bonding agents bind the cellulose particles together. The type of extruder preferably used to to form the packing peanuts is a twin-screw extruder, such as Baker-Perkins Model No. MPF-50 twin-screw extruder manufactured by APV Chemical Machinery, Ltd. of Hanley, England. In a twin-screw extruder, co-rotating or counter-rotating screws move the mix from one end of the extruder which receives the mix to the other end of the extruder which dispenses the mix. The extruder includes a mixing chamber into which the dry mix is force fed for further mixing the dry mix. Each screw has a plurality of blades which are in near contact with the barrel wall and with blades on the other screw so that the material is wiped away from the barrel wall and the blades. A more thorough mix is achieved with a twin-screw extruder than with a single-screw extruder, because a twin-screw extruder has two screws having interengaging blades which cut and blend the ingredients, whereas a single-screw extruder merely pressurizes and transports the mix. Unlike the barrel in a single-screw extruder, the barrel in a twin-screw extruder is not completely filled so there is more room in the barrel for mixing the ingredients. In twin-screw extrusion, heat is primarily derived from the energy developed by cutting the mix within the extruder, with the remainder of the heat being added to the mix by heating elements located outside the barrel wall.

Water is injected into the heated and pressurized dry mix after it exits the mixing chamber. The water introduced into the extruder may have any temperature but preferably should have a temperature of greater than approximately 50° F. and less than approximately 200° F. The temperature of the dry mix has previously been increased by the mechanical action of the screws. The introduction of water starts chemical reactions which produce more heat. It is not necessary that any additional heat be added to the wetted mix. However, better bonding is achieved when the temperature exceeds 100° F., or more preferably, is at or in excess of 180° F. Additional heat may be required to reach the more preferred range.

The water and heat activate the bonding agents and expanders in the dry mix to bond the cellulose particles together and to decrease the density of the final product, respectfully. Only a relatively small amount of water need be injected into the mix to activate the bonding agents and expanders. At the end of the extruder opposite the mixing chamber there is a die for shaping the extruded mix as it is forced from the extruder. The die forms the mix into the shape of the peanut, but may form the mix into other shapes and still fall within the scope of the present invention. A cutter separates the extruded mix from the mix in the extruder.

After the extruded mix is shaped and cut, the resultant product is dried. A number of commercially available dryers are suitable for drying the product. An example of such a dryer is a convection oven manufactured by Wenger Manufacturing, Inc. of Sabetha, Kans. A micro-wave dryer may also be used for drying the product. The resulting water content of the product after drying should be less than 40 percent by weight, preferably be less than 30 percent by weight, and most preferably be less than 20 percent water by weight. The density of the finished biodegradable peanut is less than 1.0 pound per cubic foot (lb./cu. ft.), with a preferred range between 0.1–0.5 lb./cu. ft., and a most preferred range between 0.3–0.4 lb./cu. ft. However, when the product is used in other applications, the process is adjusted to increase or decrease the density by increasing or decreasing the percentage of expanders by weight.

This invention is illustrated by the following example which is merely for the purpose of illustration and is not to be regarded as limiting the scope of the invention or manner in which it may be practiced.

EXAMPLE

A biodegradable cellulosic material in the form of a shipping peanut was prepared in accordance with the present invention. The following materials were employed in the amounts indicated.

| Material | Quantity (in pounds) |
| --- | --- |
| newsprint (cellulose) | 58.8 lbs. |
| wheat gluten (bonding agent) | 25.0 lbs. |
| wheat starch (expander) | 5.0 lbs. |
| baking powder (expander) | 1.0 lbs. |
| corn flour (bonding agent) | 30.3 lbs. |
| boron (fire retardant) | 1.2 lbs. |

The above quantities of ingredients were introduced directly into a Baker-Perkins, Model No. MPF-50, twin-screw extruder, which has 50 mm diameter bore. The cellulose material comprised shredded newsprint having a fire retardant (boron) mixed therein. The ingredients were dry mixed beforehand and then introduced into a mixing chamber provided in the extruder. Water was then injected into the mix after it exited the mixing chamber so that water comprised approximately 25 percent of the mix by weight for activating the bonding agents for binding the particles and the expanding agents (i.e., wheat starch and baking powder) for decreasing the density of the product. During the course of the experiment, the extruder was operated at temperatures between 180° F. and 350° F., and at pressures between approximately 18 to 25 psi absolute. In each instance a satisfactory product was made. As stated previously, the combinations of ingredients, temperatures and pressures may be varied for obtaining a wide variety of finished product density and hardness, depending upon the application for which the article is used.

In view of the above, it will be seen that the several objects of the invention are achieved and other advantageous results attained.

As various changes could be made in the above constructions without departing from the scope of the invention, it is intended that all matter contained in the above description as shown in the accompanying drawing shall be interpreted as illustrative and not in a limiting sense.

What is claimed is:

1. A process for making a shaped biodegradable article from cellulose-containing material, the material having a water content less than about 50 percent by weight, the process comprising:
   forming a dry-mix of the cellulose-containing material, a bonding agent and an expander;
   feeding the dry mix to an extruder;
   pressurizing the dry mix to a pressure above atmospheric pressure in the extruder;
   injecting water into the pressurized dry mix; and
   extruding the wetted mixture into a shaped article.

2. A process as set forth in claim 1 further comprising the step of drying the extruded mix to a final water content of less than 40 percent by weight.

3. A process as set forth in claim 2 wherein said extruded mix is dried in a convection oven.

4. A process as set forth in claim 1 wherein the extruded mix comprises cellulose material in an amount ranging from about 5 percent to about 90 percent by weight, bonding agent in an amount ranging from about 3 percent to about 90 percent by weight and expander in an amount ranging from about 3 percent to about 80 percent by weight.

5. A process as set forth in claim 1 wherein the extruded mix comprises cellulose material in an amount ranging from about 5 percent to about 80 percent by weight, bonding agent in an amount ranging from about 15 percent to about 80 percent by weight and expander in an amount ranging from about 3 percent to about 50 percent by weight.

6. A process as set forth in claim 1 wherein the extruded mix comprises cellulose material in an amount ranging from about 20 percent to about 60 percent by weight, bonding agent in an amount ranging from about 16 percent to about 45 percent by weight and expander in an amount ranging from about 3 percent to about 30 percent by weight.

7. A process as set forth in claim 1 wherein the dry mix is fed to an extruder having a mixing chamber and two screws.

8. A process as set forth in claim 1 further comprising the step prior to feeding the cellulose to the extruder of reducing the water content of the cellulose to less than approximately 30 percent by weight.

9. A process as set forth in claim 1 further comprising the step prior to feeding the cellulose to the extruder of reducing the water content of the cellulose to less than approximately 25 percent by weight.

10. A process as set forth in claim 1 further comprising the step of blending a fire retardant into the mix.

11. A process as set forth in claim 1 further comprising the step of blending a preservative into the mix.

12. A process as set forth in claim 1 further comprising the step of adding ingredients selected from a group consisting of boron, sodium carbonate, animal glue, carbonated water, cargenin, amino acids, nitrates and lactic acids.

13. A process as set forth in claim 1 wherein the dry mix is pressurized to a pressure above 18 pounds per square inch absolute.

* * * * *